United States Patent
Yoshida et al.

[11] Patent Number: 5,967,604
[45] Date of Patent: Oct. 19, 1999

[54] VEHICLE SEAT APPARATUS

[75] Inventors: Tadasu Yoshida, Kariya; Yukifumi Yamada, Toyota, both of Japan

[73] Assignee: Aisin Seiki Kabushiki Kaisha, Kariya, Japan

[21] Appl. No.: 08/991,191

[22] Filed: Dec. 16, 1997

[30] Foreign Application Priority Data

Dec. 17, 1996 [JP] Japan .................................. 8-337201

[51] Int. Cl.⁶ .............................. B60N 2/42; B60R 21/00
[52] U.S. Cl. .................... 297/216.19; 297/344.1; 297/216.2; 297/216.1; 297/216.16; 296/68.1; 248/429
[58] Field of Search .......................... 297/216.19, 216.1, 297/216.16, 216.2, 344.1; 296/68.1, 65.13, 65.14; 248/548, 900, 429

[56] References Cited

U.S. PATENT DOCUMENTS

| | | | |
|---|---|---|---|
| 2,735,476 | 2/1956 | Fieber | 297/216.19 |
| 2,736,566 | 2/1956 | Hartl | 296/68.1 X |
| 2,789,650 | 4/1957 | Krous | 297/216.19 X |
| 2,818,909 | 1/1958 | Burnett | 296/68.1 X |
| 2,823,730 | 2/1958 | Lawrence | 296/68.1 X |
| 3,451,719 | 6/1969 | Lorean | 297/216.1 X |
| 3,452,834 | 7/1969 | Gaut | 296/68.1 X |
| 3,669,397 | 6/1972 | Le Mire | 297/216.19 X |
| 3,724,603 | 4/1973 | Shiomi et al. | 297/216.19 X |
| 3,802,737 | 4/1974 | Mertens | 297/216.2 |
| 3,933,331 | 1/1976 | Blom | 297/344.1 X |
| 4,597,552 | 7/1986 | Nishino | 297/344.1 X |
| 4,615,551 | 10/1986 | Kinaga et al. | 248/429 X |
| 4,634,169 | 1/1987 | Hasstedt | 296/68.1 |
| 4,676,556 | 6/1987 | Yamanoi et al. | 297/216.1 X |
| 4,993,776 | 2/1991 | Acuto et al. | 297/216.1 |
| 5,207,480 | 5/1993 | Johnson et al. | 297/344.1 |
| 5,292,178 | 3/1994 | Loose et al. | 297/344.1 |
| 5,575,449 | 11/1996 | Shinbori et al. | 297/344.1 X |
| 5,662,376 | 9/1997 | Breuer et al. | 297/216.16 X |

FOREIGN PATENT DOCUMENTS 5-338484  12/1993  Japan .

*Primary Examiner*—Peter M. Cuomo
*Assistant Examiner*—Rodney B. White
*Attorney, Agent, or Firm*—Burns, Doane, Swecker & Mathis, L.L.P.

[57] ABSTRACT

A seat apparatus for a vehicle includes a seat cushion for being secured to a vehicle floor, a seat back arranged on a rear portion of the seat cushion, a sliding unit mounted on the seat cushion to permit the vehicle seat to slide relative to the vehicle floor, a pair of front brackets adapted to be fixed to the vehicle floor and connected to the sliding unit at the front end of the seat cushion and a pair of rear brackets adapted to be fixed to the vehicle floor and connected to the sliding unit at the rear end of the seat cushion. The front brackets are adapted to be deformed during a collision to permit the seat cushion to move upward. The front brackets are configured to include a first attaching portion and a second attaching portion that are spaced apart from one another.

6 Claims, 5 Drawing Sheets

VEHICLE SEAT APPARATUS

FIELD OF THE INVENTION

The present invention generally relates to a vehicle seat apparatus. More particularly, the present invention pertains to a vehicle seat apparatus provided with an absorbing unit for absorbing impact forces normally applied to a passenger during a collision.

BACKGROUND OF THE INVENTION

An example of a vehicle seat apparatus is disclosed in Japanese Patent Laid-Open Publication No. 5(1993)-338484. The vehicle seat apparatus includes a seat cushion and a seat back, with the seat cushion being secured on the vehicle floor through a pair of front brackets and a pair of rear brackets. The seat back is slidably and rotatably supported on the rear portion of the seat cushion through an absorbing unit and the seat back is connected to the vehicle floor through a wire. The wire functions to maintain a constant reclining angle of the seat back relative to the seat cushion.

When a rear end collision of the vehicle occurs, an impact force is applied to a seated person in the vehicle seat and the seat back slides relative to the seat cushion by the impact force. Therefore, the impact force is absorbed through the absorbing unit. At this time, the constant reclining angle of the seat back relative to the seat cushion is maintained by the wire.

However, this seat apparatus suffers from disadvantage that it is requires a relatively large number of parts and is somewhat complicated in construction. This is due to the fact that the seat apparatus requires the absorbing unit and the wire in order to absorb impact forces.

SUMMARY OF THE INVENTION

A need exists, therefore, for a vehicle seat apparatus which is able to absorb impacts, but which is not excessively complicated in structure and which does not require a relatively large number of parts.

According to the present invention, the seat apparatus for a vehicle includes a seat cushion adapted to be secured to a vehicle floor, a seat back arranged on a rear portion of the seat cushion, a pair of front brackets adapted to be fixed to the vehicle floor and operatively connected to the front end of the seat cushion and a pair of rear brackets adapted to be fixed to the vehicle floor and operatively connected to the rear end of the seat cushion. During a collision, the front brackets are adapted to be deformed so as to move the front end of the seat cushion upward in a lifting direction.

According to another aspect of the invention, a vehicle seat apparatus includes a vehicle seat comprised of a seat cushion and a seat back arranged on the rear portion of the seat cushion, a pair of upper rails each secured to the seat cushion; and a pair of lower rails each slidably receiving one of the upper rails. A pair of front brackets are adapted to be fixed to the vehicle floor and are each connected to a respective one of the lower rails. Each front bracket includes a first attaching portion and a second attaching portion that are connect to one another by a bent portion so that the first attaching portion and the second attaching portion are generally parallel to one another and spaced from one another. A pair of rear brackets are adapted to be fixed to the vehicle floor and are connected to a respective one of the lower rails.

Another aspect of the present invention involves a seat apparatus for a vehicle that includes a vehicle seat comprised of a seat cushion and a seat back arranged on the rear portion of the seat cushion, a pair of upper rails each secured to the seat cushion, a pair of lower rails each slidably receiving one of the upper rails, a pair of front brackets and a pair of rear brackets. The front brackets each include a first attaching portion connected to a respective one of the lower rails and a second attaching portion for being fixed to a vehicle floor. Each front bracket is configured to deform during application of an impact force so that the first attaching portion of each front bracket moves relative to the second attaching portion to permit the front end of the vehicle seat to move upwardly. The rear brackets are adapted to be fixed to the vehicle floor, with each rear bracket being connected to a respective one of the lower rails.

BRIEF DESCRIPTION OF THE DRAWING FIGURES

The foregoing and additional features of the present invention will become more apparent from the following detailed description considered with reference to the accompanying drawing figures in which like elements are designated by like reference numerals and wherein.

DETAILED DESCRIPTION OF THE PREFERRED EMBODIMENT

Figure 1:
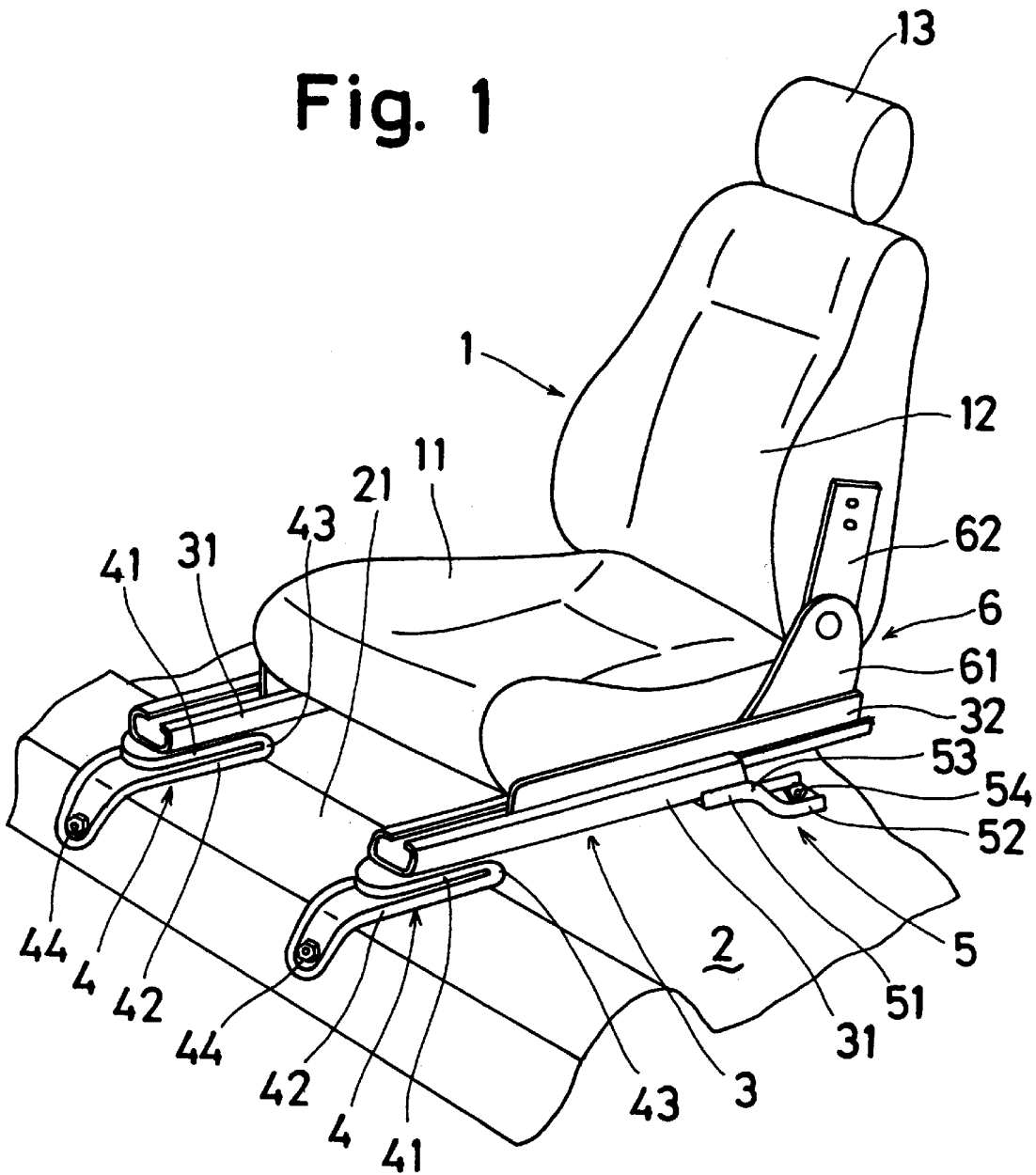
FIG. 1 is a perspective view of a vehicle seat apparatus according to the present invention.
Figure 2:
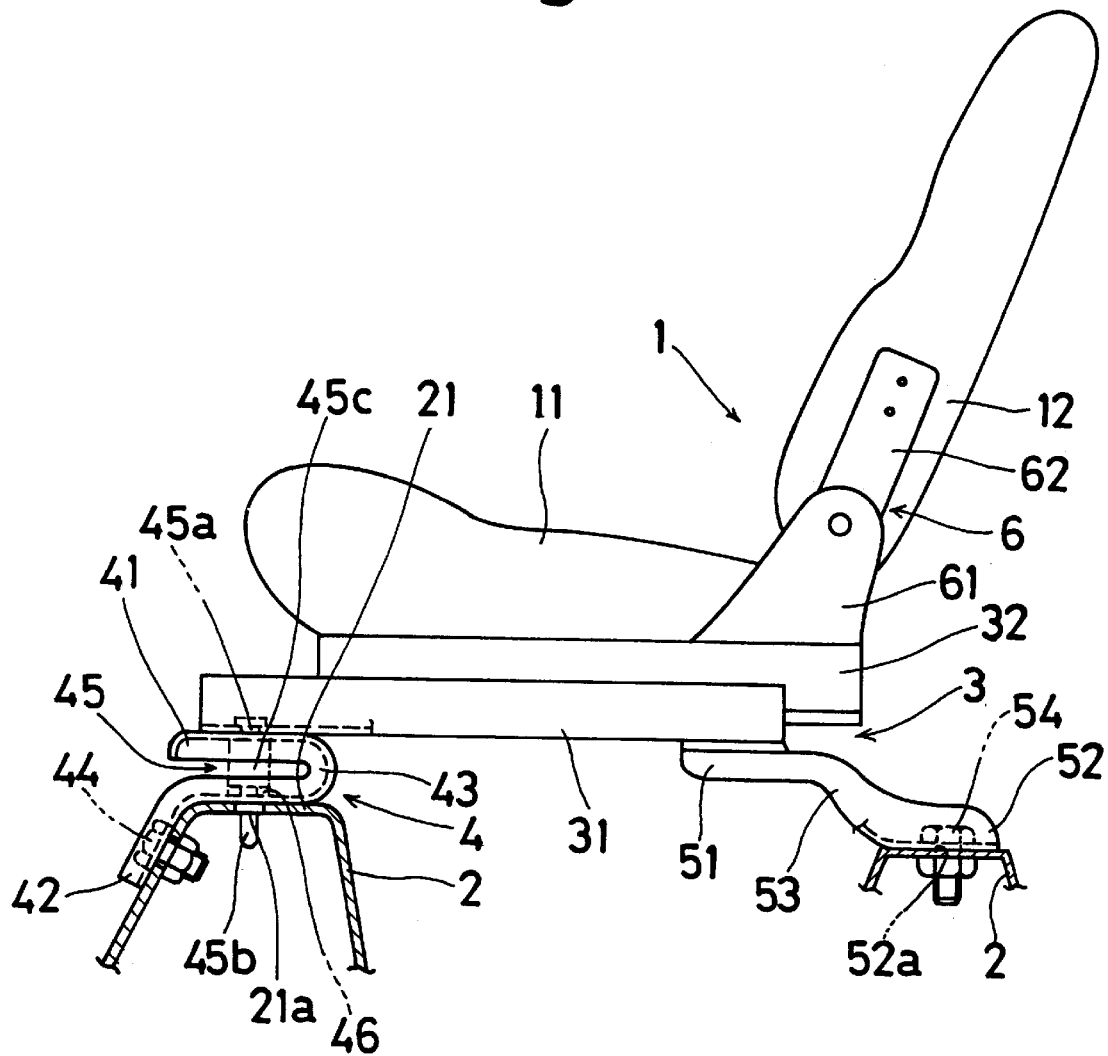
FIG. 2 is a side view of a vehicle seat apparatus according to the present invention.

As shown in FIGS. 1 and 2, the vehicle seat apparatus according to the present invention includes a vehicle seat 1 that is comprised of a seat cushion 11, a seat back 12 and a headrest 13. The seat cushion 11, on which is a person is to be seated, is secured to the vehicle floor 2 through a sliding unit 3 by a pair of front brackets 4 and a pair of rear brackets 5. The seat back 12, which is arranged on the rear portion of the seat cushion 11, supports the back of the seated passenger and is rotatably supported by a reclining unit 6. The headrest 13 supports the passenger's head and is attached to the upper end of the seat back 12.

The sliding unit 3 includes a pair of lower rails 31 and a pair of upper rails 32. The lower rails 31 are disposed parallel to each other and extend in the front to rear direction of the vehicle (i.e., left and right directions with reference to FIG. 2). The front end of each lower rail 31 is mounted on the vehicle floor 2 through a respective one of the front brackets 4 while the rear end of each lower rail 31 is mounted on the vehicle floor 2 through a respective one of the rear brackets 5.

The upper rails 32 are fixed to the seat cushion 11 and are slidably supported on a respective one of the lower rails 31 so that the upper rails 32 also extend in the front to rear direction of the vehicle.

The reclining unit 6 includes a pair of lower arms 61 and a pair of upper arms 62. The lower arms 61 are each fixed to the rear end of one of the upper rails 32. The upper arms 62 are each fixed to the lower end of the seat back 12 and are rotatably supported on one of the lower arms 61. Therefore, the seat cushion 11 and the seat back 12 slides relative to the vehicle floor 2 through the seat sliding unit 3. Also, a reclining angle between the seat back 12 and the seat cushion 11 can be adjusted by the seat reclining unit 6.

Figure 3:
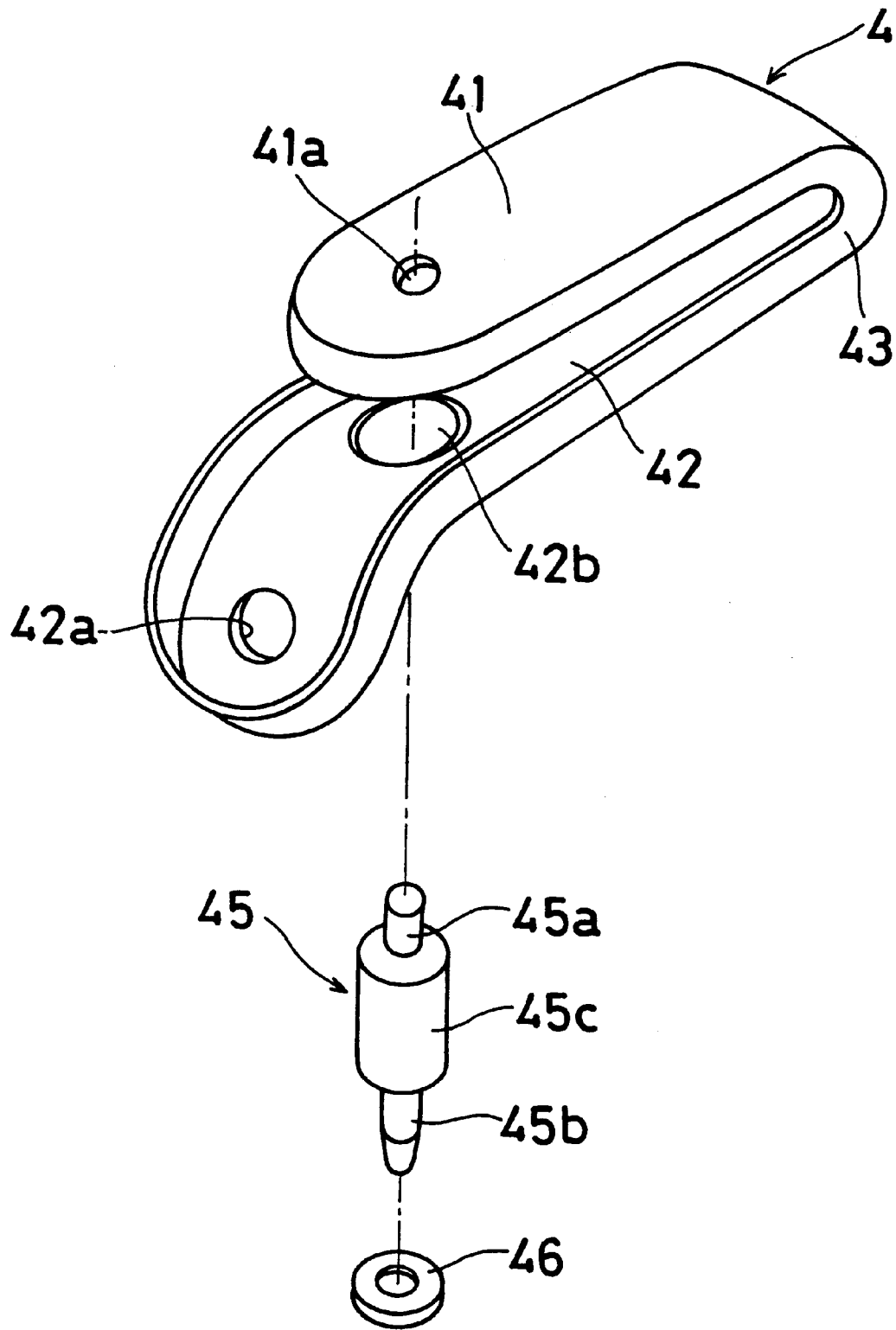
FIG. 3 is a perspective view of the front bracket forming a portion of the vehicle seat apparatus according to the present invention.

As shown in FIGS. 1 through 4, the front brackets 4 are somewhat U-shaped as seen in side view and include a first attaching portion 41 and a second attaching portion 42. The free end portion of each second attaching portion 42 is bent relative to the remainder of the second attaching portion as seen in FIG. 3. The first attaching portion 41 and the second attaching portion 42 extend in the front to rear direction of the vehicle and are connected to one another at respective rear ends thereof through a bend portion 43. Thus, each of the front brackets 4 is formed as a one piece integral unit. As described below in more detail, the front brackets 4 are designed to be able to deform at the bend portion 43 during a collision to thereby permit the vehicle seat to move in a predetermined manner.

As seen in FIGS. 2 and 3, the first attaching portion 41 of each front bracket 4 is arranged generally parallel to and closely adjacent a portion of the second attaching portion 42. A first fixing through hole 41a is formed in the first attaching portion 41 and a first through hole 42b is formed in the second attaching portion 42. A second fixing through hole 42a is also formed at the front end of the second attaching portion 42.

The first attaching portion 41 of each front bracket is adapted to be fixed to the front end of the respective lower rail 31 through a connecting pin 45 which passes through the first fixing hole 41a. The front end of the second attaching portion 42 is adapted to be fixed to the vehicle floor 2 by a bolt 44 which passes through the second fixing hole 42a.

The pin 45 which passes through the first fixing hole 41a in each front bracket 4 has a large-diameter portion 45c. A first axially extending portion 45a of the pin is formed on one end of the large-diameter portion 45c while a second axially extending portion 45b is formed on the other end of the large-diameter portion 45c of the pin 45. The first axially extending portion 45a, the large-diameter portion 45c and the second axially extending portion 45b have a common longitudinal axis. The outer diameter of the large-diameter portion 45c is larger than the diameter of the first fixing hole 41a and is also greater than the outer diameter of the first and second axially extending portions 45a, 45c of the pin 45. The diameter of the first through hole 42b in the second attaching portion 42 is generally the same as, or slightly larger than, the outer diameter of the large diameter portion 45c of the pin 45 so that the large-diameter portion 45c of the pin 45 is able to extend into the first through hole 42b.

The first axially extending portion 45a of the pin 45 is connected to the respective lower rail 31 through the first fixing hole 41a so that the first attaching portion 41 is fixed to the lower rail 31. A second through hole 21a is formed in a fixing portion 21 of the vehicle floor 2. The diameter of the second through hole 21a is generally the same as, or slightly larger than, the outer diameter of the second axially extending portion 45b of the pin 45 so as to permit the second axially extending portion 45b of the pin 45 to extend through the second through hole 21a.

Figure 4:
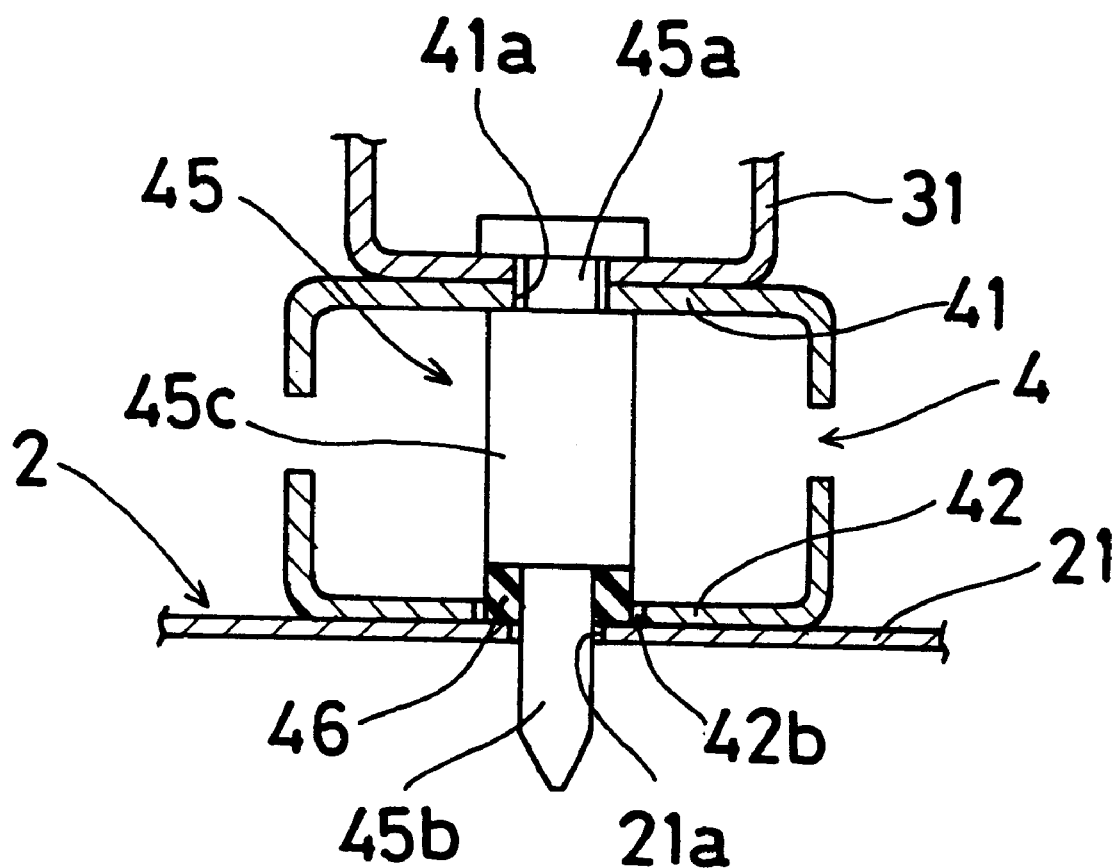
FIG. 4 is a cross-sectional view of the front bracket of the vehicle seat apparatus according to the present invention secured to the vehicle floor.

An elastic bush 46 engages and surrounds the second axially extending portion 45b of the pin 45. The outer diameter of the bush 46 is substantially the same as the outer diameter of the large-diameter portion 45c of the pin 45 as seen in FIG. 4 and contacts the end of the large-diameter portion 45c that adjoins the second axially extending portion 45b. The second axially extending portion 45b of the pin 45 is inserted in the second through hole 21a in the fixing portion 21 of the vehicle floor 2. The elastic bush 46 extends through the first through hole 42b in the second attaching portion 42 of the front bracket 4 and contacts the fixing portion 21 of the vehicle floor 2. Therefore, the pin 45 determines the attached position of the front brackets 4 relative to the vehicle floor 2. Also, the pin 45 contributes to defining the space between the first and the second attaching portion 41, 42 of the front brackets 4.

As shown in FIGS. 1 and 2, each of the rear brackets 5 includes a third attaching portion 51 and a fourth attaching portion 52. The third attaching portion 51 and the fourth attaching portion 52 are disposed parallel to each other and extend in the front to rear direction of the vehicle. The rear brackets 5 are formed as a one piece integral unit, with the third attaching portion 51 and the fourth attaching portion 52 of each rear bracket 5 being connected to one another through a bent portion 53. The rear brackets 5 are able to deform at the bent portion 53. The third attaching portion 51 is fixed to the rear end of the lower rail 31 through a pin while the fourth attaching portion 52 is fixed to the vehicle floor 2 by a bolt 54.

By virtue of the construction described above and shown in FIGS. 1–4, the seat 1, which is comprised of the seat cushion 11 and the seat back 12, is secured to the vehicle floor 2 through the front brackets 4 and the rear brackets 5. The front and rear brackets 4, 5 are operatively connected to the seat cushion of the vehicle seat by way of the sliding unit 3.

Figure 5:
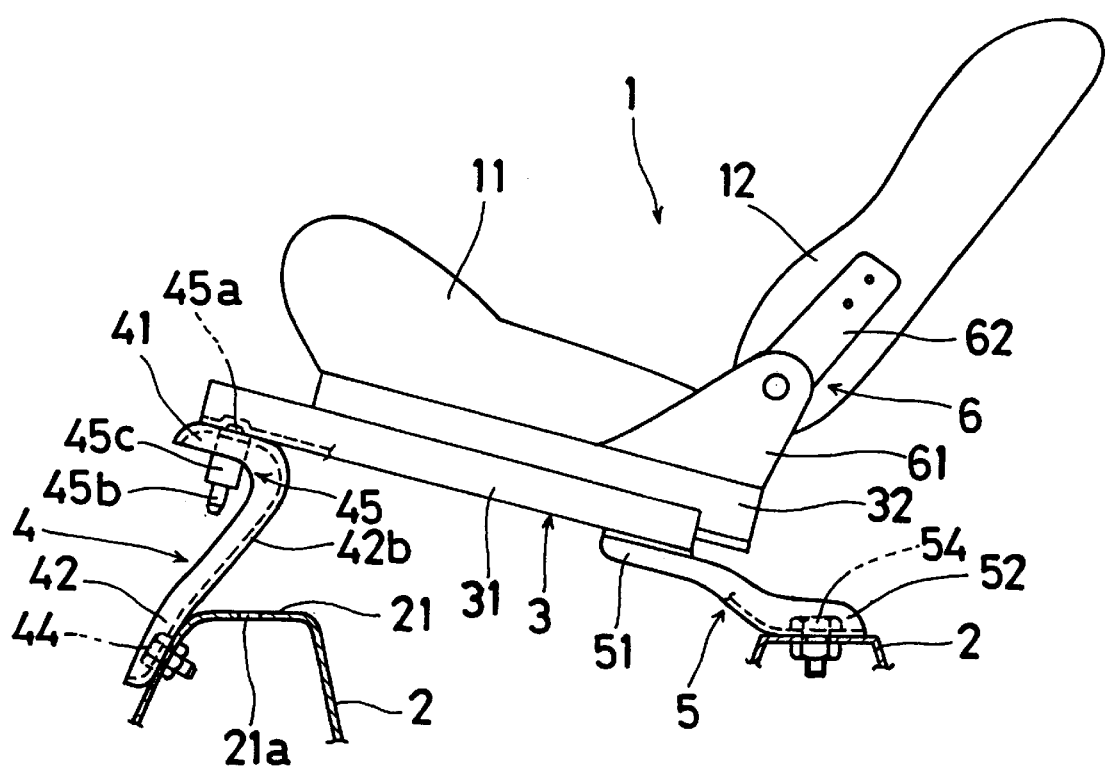
FIG. 5 is a side view of the vehicle seat apparatus according to the present invention when an impact force is applied.

When a rear vehicle collision occurs (i.e., an impact force is applied to the rear of the vehicle), a rearward impact force is applied to the person who is seated on the seat 1, and the seat back 12 is pushed in the rear direction by the force from the person. Therefore, the front end of the seat cushion 11 is lifted upward in the manner shown in FIG. 5. The seat cushion 11 thus rotates in the clockwise direction. At this time, the front brackets 4 are deformed so that the first attaching portion 41 moves apart from the second attached portion 42 as shown in FIG. 5. Also, the rear bracket 5 deforms in response to the rotation of the seat cushion 11. During this rotation, the second axially extending portion 45b of the pin 45 is released from the second through hole 21a. Therefore, the impact force can be absorbed through deformation of the front brackets 4. At this time, the seat back 12 also moves relative to the vehicle floor 2 following the rotation of the seat cushion 11. When the impact force is applied to the seat 1, the reclining angle between the seat back 12 and the seat cushion 11 is held at a constant reclining angle. Therefore, the seating posture of the passenger does not change (i.e., the passenger does not stretch out) and the passenger is reliably retained on the seat 1 in a stable manner.

When the front end of the seat cushion is pushed downwardly, such as that which occurs when a passenger is seated in the seat or during a front vehicle collision (i.e., when an impact force is applied to the front of the vehicle), the end of the large-diameter portion 45c of the pin 45 contacts the fixing portion 21 of the vehicle floor 2 through the elastic bush 46. By virtue of this contact of the large-diameter portion 45c of the pin 45 with the fixing portion 21 of the vehicle floor through the elastic bush 46, the deformation of the front brackets 4 is restricted. Also, the elastic bush 46 decreases contact noise occurring when the large-diameter portion 45c of the pin 45 is urged towards the fixing portion 21 of the vehicle floor 2.

It can thus be seen that by virtue of the construction of the vehicle seat apparatus of the present invention, a relatively uncomplicated mechanism is provided for not only mounting the vehicle seat on the vehicle floor, but for also absorbing impacts that occur during front and rear end collisions of the vehicle. The deformation of the front brackets 4 during rear end collisions and the deformation of the bush 46 during front end collisions results in the absorption of impact forces in a way that does not require a significant number of parts as in other known vehicle seat apparatus constructions.

The principles, preferred embodiment and modes of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A seat apparatus for a vehicle, comprising:
   a vehicle seat that includes a seat cushion and a seat back arranged on a rear portion of the seat cushion;
   a pair of upper rails each secured to the seat cushion;
   a pair of lower rails each slidably receiving one of the upper rails;
   a pair of front brackets, each front bracket including a first attaching portion connected to a respective one of the lower rails and a second attaching portion adapted to be connected to a vehicle floor, the first and second attaching portions of each front bracket being connected to one another by a bent portion so that the first attaching portion and the second attaching portion are generally parallel to one another and spaced from one another, said first attaching portion of each front bracket including a through hole and said second attaching portion of each front bracket including a through hole;
   a pair of connecting pins, each connecting pin extending through the through hole in the front attaching portion and the through hole in the second attaching portion of one of the front brackets; and
   a pair of rear brackets for being fixed to the vehicle floor, each rear bracket being connected to a respective one of the lower rails.

2. A seat apparatus according to claim 1, including an elastic member mounted on each connecting pin.

3. A seat apparatus according to claim 2, wherein each connecting pin includes a large-diameter portion, a first axially extending portion extending from one end of the large-diameter portion and a second axially extending portion extending from an opposite end of the large-diameter portion.

4. A seat apparatus according to claim 3, wherein said elastic member is mounted on the second axially extending portion of each connecting pin, the second axially extending portion of each connecting pin extending through the through hole in the second attaching portion.

5. A seat apparatus according to claim 4, wherein each elastic member is received in the through hole in the second attaching portion of each front bracket.

6. A seat apparatus according to claim 1, wherein each connecting pin includes a large-diameter portion, a first axially extending portion extending from one end of the large-diameter portion and a second axially extending portion extending from an opposite end of the large-diameter portion, the first and second axially extending portions of each connecting pin having an outside diameter that is smaller than the outside diameter of the large-diameter portion of the connecting pin.

* * * * *